United States Patent [19]

Thompson et al.

[11] 4,360,943
[45] Nov. 30, 1982

[54] RETENTION CLIP

[75] Inventors: Robert L. Thompson, Doncaster; Douglas E. Scotcher, Elwood, both of Australia

[73] Assignee: Nu-View Pty. Ltd., Victoria, Australia

[21] Appl. No.: 212,436

[22] Filed: Dec. 3, 1980

[51] Int. Cl.³ ............................ B60S 1/02; B60S 1/38
[52] U.S. Cl. .................................................. 15/250.42
[58] Field of Search ........................ 15/250.36–250.42

[56] References Cited

U.S. PATENT DOCUMENTS

| | | | |
|---|---|---|---|
| 3,626,544 | 12/1971 | Lopez et al. | 15/250.42 |
| 3,667,083 | 6/1972 | Linker | 15/250.42 |
| 3,940,823 | 3/1976 | Rosenbeck | 15/250.42 |
| 4,156,951 | 6/1979 | Sharp | 15/250.42 |

FOREIGN PATENT DOCUMENTS 1957856 5/1971 Fed. Rep. of Germany ... 15/250.42

*Primary Examiner*—Peter Feldman
*Attorney, Agent, or Firm*—Fleit & Jacobson

[57] ABSTRACT

A retention clip to secure a windscreen wiper rubber and an associated backing strip to a windscreen wiper blade superstructure comprises spaced, substantially parallel first and second parts integral with an interconnecting third part. The first part has a pair of spaced, co-planar prongs with a recess formed in the outer-most side edge of each prong, the recess being of a shape and dimension to releasably engage a cooperating part of the superstructure. The integral second part has a tongue which engages in one end of a longitudinal slot in the backing strip in which is engaged a head portion of the wiper rubber. The tongue has a downwardly turned end portion to deform the wiper rubber and wedge the tongue, rubber and backing strip together.

10 Claims, 7 Drawing Figures

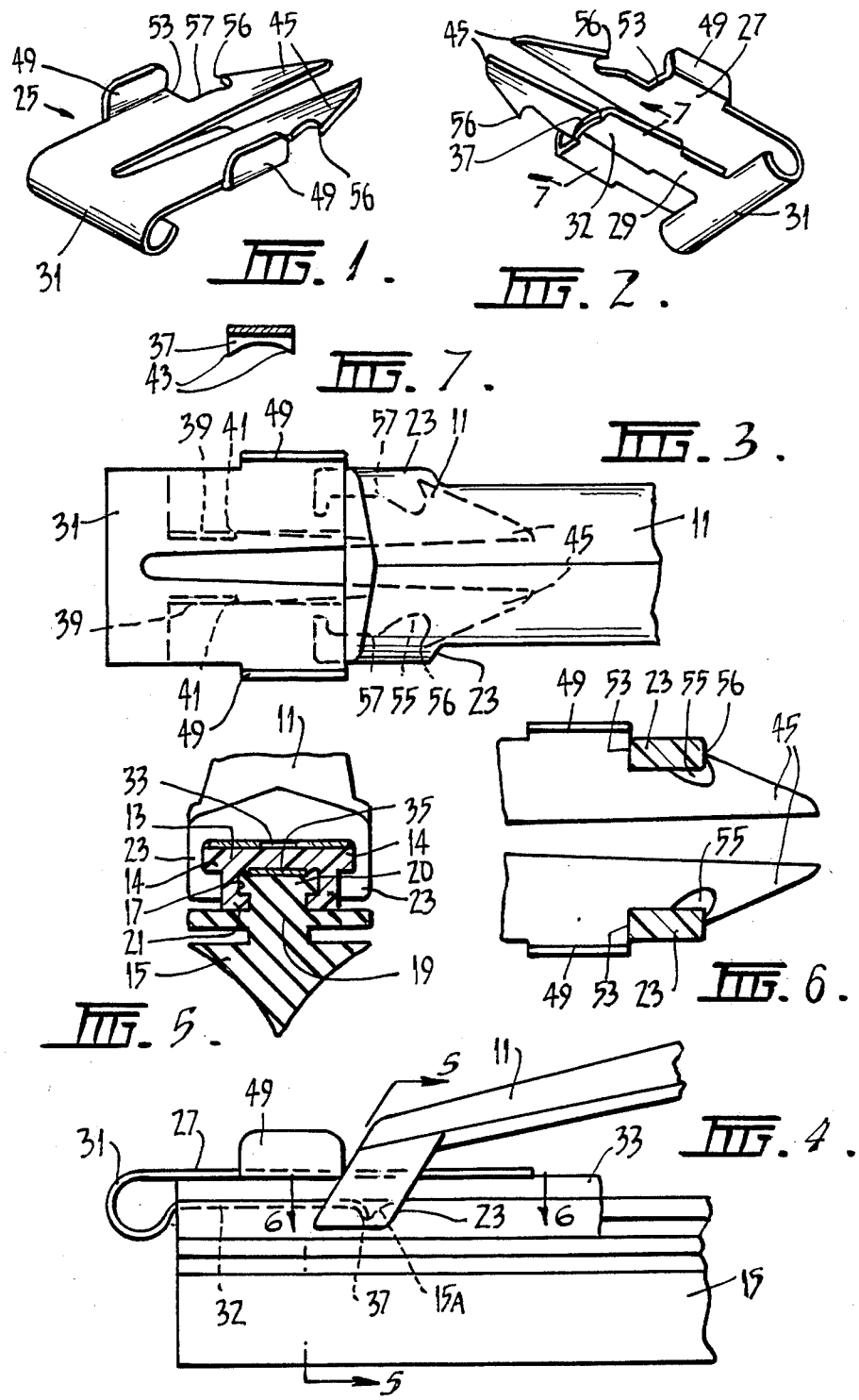

4,360,943

RETENTION CLIP

BACKGROUND OF THE INVENTION

The present invention relates to the securement of windscreen wiper blade rubbers to windscreen wiper blade structures.

Conventionally windscreen wiper blade rubbers are secured to wiper blade structures by inserting the rubber into a backing strip which generally comprises a longitudinal member having a longitudinal slot to receive a head portion of wiper blade rubber. The backing strip may be a thin metal strip formed as a pair of rails joined by upraised bridge members, the rails defining a slot therebetween into which the rubber head portion is inserted. Alternatively the backing strip may be a molded or extruded plastic strip having a wiper rubber receiving slot with a narrow mouth defined by longitudinal side rails extending along the length thereof.

These backing strips serve as the means of attachment of the wiper blade rubber to the wiper blade structure. Generally the backing strip is supported between a number of longitudinally spaced, laterally opposed claws of the wiper blade structure. By this means the backing strip (with inserted rubber) is laterally secured to the wiper blade structure. However, additional means must be provided to longitudinally secure the rubber in the backing strip slot and to longitudinally secure the backing strip to the wiper blade structure.

In the prior art this longitudinal securement has been achieved in various ways.

One prior art arrangement utilizes claws at each end of the wiper blade structure which have perpendicularly protruding end pieces. The backing strip and wiper blade rubber are imprisoned between the end pieces and so are longitudinally retained. However, this arrangement is costly in that end claw members must be specifically fabricated for this purpose.

Other prior art arrangements have utilized pairs of retention clips, one attached to each of the end claws of the wiper blade. These prior art retention clips are formed with a perpendicularly extending portions which engage with the ends of the slot in the backing strip and serve to imprison the backing strip and wiper rubber therebetween. However, two clips must be used, one at end of the wiper blade.

SUMMARY OF THE INVENTION

Briefly, the present invention comprises a retention clip to secure a windscreen wiper blade rubber and an associated backing strip to a windscreen wiper blade superstructure wherein the backing strip is formed with a longitudinal slot to receive a longitudinal head portion of the rubber. The retention clip is formed with a first part which has means to releasably secure the clip to a part of the wiper superstructure. The clip further has a second part which includes a tongue dimension to engage within the slot from one end and be disposed between the backing strip and the head portion of the rubber in the slot. The tongue has means to engage with the rubber in the slot to frictionally secure the rubber relative to the backing strip.

In one form, the retention clip has a pair of prongs on the first part, the prongs each having an undercut recess in an outermost edge, which recesses are engageable with claw members of the windscreen wiper superstructure. Finger pieces on the prongs enable the prongs to be moved towards each other to release the engagement of the recesses and claws.

The tongue is preferably formed with a downwardly turned end portion which compresses the head portion of the rubber in the slot in the vicinity of the turned end portion to thereby wedge or jam the rubber in the slot to restrict relative longitudinal movement.

The present invention has been devised to overcome the disadvantages of the known retention means for securing the windscreen wiper rubber relative to the backing strip and the wiper superstructure.

It is an object of the present invention to provide a single retention clip which secures the rubber and the backing strip relative to the windscreen wiper structure to prevent relative movement.

It is also an object of the present invention to provide a retention clip which is readily releasable to facilitate replacement of the windscreen wiper rubber.

Other objects and advantages of the present invention will become apparent to one skilled in the art from the following description of a preferred embodiment which is described with reference to the accompanying drawings.

BRIEF DESCRIPTION OF THE DRAWINGS

FIG. 1 is a perspective view from above of the retention clip of the present invention, FIG. 2 is a perspective view from below of the clip of FIG. 1, FIG. 3 is a top plan view showing the retention clip of FIG. 1 securing a backing strip and a wiper blade rubber to the endmost claw of a wiper blade superstructure, FIG. 4 is a side elevational view of the structure of FIG. 3, FIG. 5 is a sectional view along lines 5—5 of FIG. 4, FIG. 6 is a sectional view along lines 6—6 of FIG. 4, and FIG. 7 is a sectional view along line 7—7 of FIG. 2.

DESCRIPTION OF THE ILLUSTRATED EMBODIMENT

Referring to the drawings there is shown a retention clip 25 which is adapted to secure a windscreen wiper blade rubber 15 and associated backing strip 13 to the end-most claw 11 of a windscreen wiper blade superstructure (not shown).

In the illustrated embodiment, the backing strip 13 comprises an elongated extrusion of synthetic plastics material having a longitudinal slot 17 the mouth 19 of which is defined by opposed side rails 21. The width of the slots 17 is greater than the width of the mouth 19 and the windscreen wiper rubber 15 is formed with a head portion 20 of a shape and dimensions to engage within the slot 17. It will therefore be seen that while the rubber 15 may be moved longitudinally relative to the backing strip 13, the rubber 15 cannot be withdrawn from the slot 17 in a direction perpendicular to the longitudinal direction.

The backing strip 13 is provided with longitudinally extending flanges 14 on each side thereof and the claw 11 of the windscreen wiper superstructure has opposed pincers 23 which engage beneath the flanges 14 to thereby support the backing strip 13 in the claw 11. However, the backing strip 13 is movable relative to the claw 11 in a longitudinal direction.

The retention clip 25 serves to longitudinally secure the wiper rubber 15 within the slot 17 and to releasably secure the backing strip 13 within the claw 11. The retention clip 25 is a generally U-shaped member comprising a first portion 27 and a second portion 29 which underlies the first portion 27, the first and second portions extending from a curved end section 31. The retention clip 25 is preferably formed of a spring steel or other relatively resilient material including other metals and synthetic plastic materials.

The first and second portions 27 and 29, respectively, extend in generally parallel planes and are spaced apart a distance which corresponds to the distance between the upper surface 33 of the backing strip 13 and the upper surface 35 of the slot 17. The second clip portion 29 includes a forwardly extending tongue 32 of tapering width and configured so that it may be inserted into one end of the backing strip slot 17. The free end portion 37 of the tongue 32 is bent downwardly and away from the first portion 27 so that, in use, the end portion 37 depends away from the inside upper slot surface 35. Consequently, when a wiper rubber 15 and the tongue 32 are simultaneously inserted into the end of the slot 17, the depending end portion 37 effects a compression or deformation of the portion 15A of the wiper rubber 15. The compression or deformation is directed away from the upper surface 35 of the slot 17 whereby the rubber 15 is effectively wedged or jammed within the slot 17. Further, the resiliency of the rubber 15 forces the surface of the tongue 32 against the upper surface 35 of the slot 17.

The width of the tongue 32 increases from the end portion 37 to a pair of opposed shoulders or corners 41 which are a width to form an interference fit with the side walls 39 of the slot 17. The corners 41 are preferably configured so as to bite into the side walls 39 to thereby assist in retaining the tongue 32 in the engaged position within the slot 17.

The depending end portion 37 of the tongue 32 is formed with relatively sharp corners 43, as best seen in FIG. 7. The corners 43 tend to bite into the surface of the deformed rubber portion 15A thereby further promoting a secure fastening of the rubber 15 within the slot 17.

The first portion 27 of the retention clip 25 is formed with two prongs 45 separated by a central slot 47. Each prong 45 has an upstanding finger grip 49 to facilitate flexing of the prongs 45 towards each other. Each prong 45 is formed on its outer surface with a shoulder 53 and a cut-out portion 55. The cut-out portion 55 defines, with the edge of the prong 45, an undercut shoulder 56. The shoulder 53, cut-out portion 55 and undercut shoulder 56 define a recess 57 into which a respective pincer 23 is located when the clip 25 is engaged with the claw 11.

Each of the prongs 45 has a tapered forward end to facilitate insertion of the retention clip 25 between the opposed pincers 23. Flexing of the prongs 45 towards each other enables the retention clip 25 to be withdrawn from its engagement with the claw 11.

In use, the second portion 29 of the retention clip 25 is engaged with the wiper rubber 15 and the backing strip 23 as previously described. With the flanges 14 of the backing strip 13 engaged between the pincers 23, the clip, backing strip and rubber assembly is moved longitudinally relative to the claw 11 so that the prongs 45 engage between the pincers 23 whereby the prongs 45 are flexed towards each other and the recesses 57 moved opposite the pincers 23. When the prongs move apart, the recesses 57 engage with the pincers 23 to secure the parts against relative longitudinal movement.

It will be understood that the term windscreen wiper rubber encompasses any flexible material suitable for use with a windscreen wiper blade and which serves to sweep a windscreen or similar surface. Usually this material is rubber but substitute materials such as synthetic plastic materials may also be used.

We claim:

1. A retention clip for securing a windscreen wiper blade rubber and an associated backing strip to a windscreen wiper blade superstructure and wherein said backing strip is formed with a longitudinal slot to receive a head portion of the wiper blade rubber, said clip comprising first and second portions which lie in substantially parallel planes spaced apart a distance substantially equal to the thickness of the backing strip between an upper surface thereof and a top surface of the slot, said first portion having means for releasably securing the clip to a part of the windscreen wiper blade superstructure, and said second portion being integral with the first portion, the second portion including a tongue dimensioned to engage longitudinally within the said slot in the backing strip from one end thereof, the tongue being disposed between the backing strip and the head portion of the wiper blade rubber at the said one end, the tongue having means for engaging with the said wiper blade rubber in said slot.

2. A clip according to claim 1 wherein the free end of said tongue is turned out of the plane of the tongue away from said first portion.

3. A clip according to claim 1 wherein said tongue has a width which increases from the free end thereof to a pair of opposed shoulders spaced from the free end, the shoulders being an interference fit in the slot in the backing strip.

4. A clip according to claim 1 wherein said first portion comprises a pair of spaced apart substantially co-planar prongs having upstanding finger pieces for flexing the prongs towards each other.

5. A clip according to claim 4 wherein the outer edge of each prong has a pair of spaced shoulders defining a recess, the longitudinal extent of which is substantially equal to the corresponding dimension of a claw of the superstructure so that the claw engages in the opposed recesses to releasably secure the clip to the claw.

6. A retention clip to secure a windscreen wiper blade rubber and associated backing strip to a wiper blade superstructure, and wherein said backing strip is formed with a slot to receive a head portion of the wiper blade rubber, said clip comprising integral first and second portions with the first portion overlying the second portion and spaced therefrom, said second portion having a tongue of a width to engage in the slot in the said backing strip from one end thereof so as to be disposed between said backing strip and the said head portion of the wiper blade rubber within the slot, said first portion having two laterally spaced, substantially co-planar prongs each formed with means to releasably engage a part of the wiper blade superstructure.

7. A retention clip according to claim 6 wherein said second portion has a downwardly turned end extending away from said first portion, said downwardly turned end having one or more points which bite into the surface of the head portion of the wiper rubber.

8. A clip according to claim 6 having a curved end portion interconnecting said first and second portions.

9. A clip according to claim 6 wherein the means to releasably engage the superstructure comprises shoulders on each prong which engage behind co-operating pincers on the superstructure.

10. A clip according to claim 9 wherein each prong has a finger piece, the finger pieces being movable towards each other to flex the prongs together so that the shoulders engaged behind the pincers can be disengaged.

* * * * *

UNITED STATES PATENT AND TRADEMARK OFFICE
CERTIFICATE OF CORRECTION

PATENT NO. : 4,360,943

DATED : November 30, 1982

INVENTOR(S) : Robert L. Thompson, et al

It is certified that error appears in the above—identified patent and that said Letters Patent is hereby corrected as shown below:

Column 1, line 47, insert --each-- between "at" and "end".

Column 1, line 58, change "dimension" to read --dimensioned--.

Column 3, at line 45, delete "47"; and
at line 62, delete "23" and insert --13--.

Signed and Sealed this

Second Day of August 1983

[SEAL]

Attest:

GERALD J. MOSSINGHOFF

Attesting Officer

Commissioner of Patents and Trademarks